Oct. 13, 1925.
A. H. CANDEE
1,557,020
DOOR CONTROLLING CIRCUITS
Filed May 7, 1919
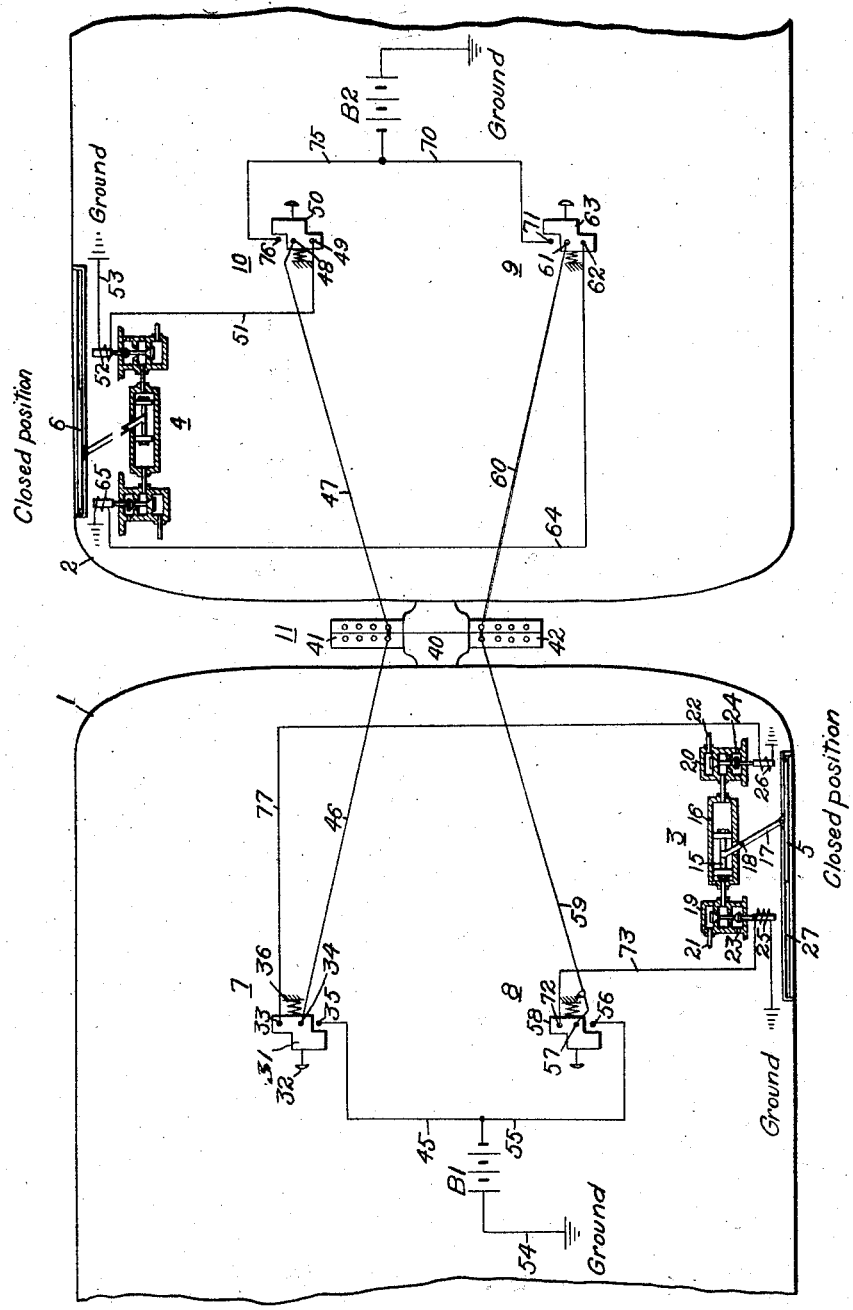
WITNESSES:
J. A. Helsel
W. R. Coley
INVENTOR
Andrew H. Candee
BY
Wesley G. Carr
ATTORNEY Patented Oct. 13, 1925.

1,557,020

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

DOOR-CONTROLLING CIRCUITS.

Application filed May 7, 1919. Serial No. 295,328.

*To all whom it may concern:*

Be it known that I, ANDREW H. CANDEE, a citizen of the United States, and a resident of Pittsburgh, in the county of Allegheny and State of Pennsylvania, have invented a new and useful Improvement in Door-Controlling Circuits, of which the following is a specification.

My invention relates to door-controlling circuits for electric railway vehicles and the like, and it has for its object to provide a simplified system requiring the use of a minimum number of wires or conductors per car.

More specifically stated, it is the object of my invention to provide, in conjunction with electrically-controlled door-operating mechanisms in adjacent vehicles, an opening and a closing push-button in each vehicle which are so electrically interlocked that only two wires per car are required to effect the opening or closing of a car door upon another vehicle.

Other minor objects of my invention will become evident from the following description, taken in conjunction with the accompanying drawing, wherein the single figure is a diagrammatic view representing a plurality of railway vehicles equipped in accordance with my present invention.

Referring to the drawing, a plurality of adjacent railway vehicles are generally indicated by the reference characters 1 and 2, the vehicles being provided with one or more operating mechanisms 3 and 4, respectively, for actuating car doors 5 and 6. A pair of push-button devices 7 and 8 are provided upon the vehicle 1 for governing the opening and the closing of the door 6 upon the other vehicle, while push-button devices 9 and 10, conveniently located upon the vehicle 2, are employed for respectively opening or closing the door 5 on the other car 1.

A suitable coupling means 11 for mechanically joining the adjacent vehicles and for also effecting the interconnection of the necessary electric circuits for the two vehicles, is provided in accordance with a customary practice.

The operating mechanism 3 may be of any familiar type and is here shown as comprising a duplex piston member 15 that travels within a suitable operating cylinder 16 and actuates a bar or rod 17 that oscillates about an intermediate pivotal point 18 for the purpose of opening or closing the door 5. A plurality of valves 19 and 20 communicate with the respective ends of the cylinder 16 and are normally closed to prevent the access of fluid pressure, from any suitable source, (not shown) through a plurality of pipes or passages 21 and 22, respectively, to the operating cylinder. The valve 19 is provided with an outlet port 23, and the valve 20 with a similar outlet port 24, whereby communication is established between the respective ends of the cylinder and the atmosphere whenever the actuating coils 25 and 26 for the respective valves 19 and 20 are de-energized. During operation, the coils may be energized from any suitable source, such as batteries B1 and B2 that are located upon the vehicles 1 and 2, respectively.

The operation of the controlling mechanism 3 may be set forth as follows: The door 5 is illustrated as occupying its closed position, as indicated by the accompanying legend, and to actuate the door within a suitable guide or frame 27, the opening coil 25 is energized to admit fluid pressure from the inlet pipe 21 through the valve 19 to the cylinder 16. In this way, the piston member 15 is actuated towards the right, to effect the desired opening movement of the door 5 towards the left.

To produce the return movement of the door to the illustrated position, the closing coil 26 is alone energized, whereupon fluid pressure is admitted to the right-hand end of the cylinder 16 to cause the piston member 15 to return to the position shown, and thereby close the door 5.

Since the operating mechanism 4 is a duplicate of the mechanism 3, just described, no further description thereof is deemed necessary.

The push-button device 7 comprises a two-position electrical contact segment or plate 31 which is adapted to engage a plurality of control fingers 33 and 34 in the illustrated position, and engage control fingers 34 and 35 in its other position, as determined by a spring 36 which normally maintains the contact segment 31 in the illustrated position, or by pressure of the operator's hand or foot upon a push-button 32, acting in opposition to the spring 36.

The remaining push-button devices 8, 9 and 10 are identical with the device 7, just described, and, consequently, no further exposition thereof is required.

The coupling means 11 may take any well-known form and comprises, essentially, a mechanical coupler 40 for joining the two vehicles 1 and 2 and an electrical coupler having two portions 41 and 42 which are conveniently located upon opposite sides of the mechanical coupler 40. The electrical couplers 41 and 42 comprise a plurality of co-operating contact members in the form of prongs and sockets, whereby the train-line conductors for operating the multiple-unit control systems, with which the vehicles 1 and 2 are preferably equipped, may be conveniently inter-connected. Likewise, the illustrated door-controlling circuits utilize one set of such co-operating contact members in each of the coupler parts 41 and 42.

Assuming that the vehicles have come to rest and it is desired to open the car door 6, which, for the time being, is located adjacent to a station platform, the opening push-button device 7 is pressed to establish a circuit from the positive terminal of the battery B1 through conductor 45, control fingers 35 and 34, which are bridged by contact segment 31 of the push-button device, conductor 46, co-operating contact members of the electrical coupler 41, conductor 47, control fingers 48 and 49, which are bridged by contact segment 50 of the closing push-button device 10 in its normal position, whence circuit is completed through conductor 51, opening coil 52, and conductor 53 to return-circuit conductor Ground, which is connected through conductor 54 to the negative terminal of the battery B1.

Consequently, the door-operating mechanism 4 is actuated, in accordance with previously described operating principles, to move the door 6 to its open position. It will be appreciated that only a momentary pressure upon the push-button device 7 is necessary to accomplish the desired result.

To effect the closure of the car door 6, when it is desired to re-start the vehicle, the closing push-button 8 upon the vehicle 1 is depressed to establish a circuit from the positive terminal of the battery B1 through control fingers 56 and 57, which are bridged by contact segment 58 of the push-button 8, conductor 59, co-operating contact members of the electrical coupler 42, conductor 60, control fingers 61 and 62, which are bridged by contact segment 63 of the opening push-button device 9 in its normal position, whence circuit is completed through conductor 64, closing coil 65 of the door-operating mechanism 4, and thence, through Ground, to the negative terminal of the battery B1. In this way, the door 6 is re-closed by a momentary pressure upon the push-button device 8.

Assuming that it is desired to operate the door 5 upon the vehicle 1 through the agency of push-buttons 9 and 10 upon the vehicle 2, such operation may be accomplished as follows: By depressing the opening push-button device 9, a circuit is established from the positive terminal of the battery B2 through conductor 70, control fingers 71 and 61, which are bridged by contact segment 63 of the push-button device, conductors 60 and 59, control fingers 57 and 72, which are bridged by contact segment 58 of the closing push-button device 8 in its normal position, whence circuit is completed through conductor 73 and opening coil 25 of the door-operating mechanism 23 to Ground. The door 5 is thus actuated to its open position.

To close the door 5, the closing push-button device 10 is depressed, whereupon a circuit is established from the positive terminal of the battery B2 through conductor 75, control fingers 76 and 48, which are bridged by contact segment 50 of the push-button device, conductors 47 and 46, control fingers 34 and 33, which are bridged by contact segment 31 of the opening push-button device 7 in its normal position, whence circuit is completed through conductor 77 and closing coil 26 of the door-operating mechanism 3 to Ground.

I desire it to be understood that, for the sake of simplicity and clearness, the simplest possible embodiment of my invention is here shown, and that, in practice a larger number of doors would be governed from the illustrated push-buttons by connecting the desired door-controlling circuits in parallel relation. Moreover, the doors themselves are preferably employed to open or close interlocking circuits with the master controller for governing the multiple-unit operation of the vehicles, whereby the train cannot be started into operation unless all of the doors are closed, in accordance with a familiar operating practice.

It will be seen that I have thus provided a plurality of car-door-controlling circuits employing only two train-line conductors per vehicle, in conjunction with an opening and a closing push-button device upon each vehicle, the closing-coil circuit for closing the door upon one car being interlocked through the closing push-button device upon an adjacent car and through the opening push-button device upon the first car.

Furthermore, when the various push-button or switching devices occupy the illustrated normal positions, a closed circuit through Ground is established, including unlike, i. e. opening and closing, push-buttons and actuating coils upon the adjacent vehicles.

I do not wish to be restricted to the specific circuit connections, structural details, or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a plurality of door-operating mechanisms, of a plurality of similar two-position switching devices respectively located near and remote from one of said mechanisms, and means including said devices for effecting the operation of that mechanism.

2. The combination with a plurality of car-door-operating mechanisms, of a plurality of identical switching devices respectively located in the same car and in a different car relative to one of said mechanisms, and means including said devices in unlike positions for effecting the operation of that mechanism.

3. The combination with a plurality of car-door-operating mechanisms, of a plurality of two-position push-button devices respectively located in the same car and in an adjacent car relative to one of said mechanisms, and means including said push-button devices for effecting the operation of that mechanism.

4. The combination with a plurality of car-door-operating mechanisms, of a plurality of push-button devices respectively located in the same car and in an adjacent car relative to one of said mechanisms, and means including said push-button devices and a single electrical connection between the cars for effecting the operation of that mechanism.

5. The combination with a plurality of car-door-operating mechanisms, of a plurality of push-button devices respectively located in the same car and in an adjacent car relative to one of said mechanisms, and means including said push-button devices in operated and in normal positions, respectively, and a single train-line conductor for effecting the operation of that mechanism.

6. The combination with a plurality of car-door-operating mechanisms, of a plurality of switching devices upon each car respectively corresponding to the opening and to the closure of the several mechanisms, and means for connecting a certain door-actuating circuit on one car through the corresponding switching device on a different car and through a non-corresponding device on the same car.

7. The combination with a plurality of car-door-operating mechanisms, of a plurality of switching devices upon each car respectively corresponding to the opening and to the closure of the several mechanisms, and means for connecting the door-closing circuit on one car through the door-closing switching device in an adjacent car and through the door-opening device on the same car.

8. The combination with a plurality of car-door-operating mechanisms, of a plurality of push-button devices upon each car respectively corresponding to the opening and to the closure of the several mechanisms, and means for connecting the door-opening circuit on one car through the door-opening push-button device in an adjacent car and through the door-closing device on the same car.

9. The combination with a plurality of car-door-operating mechanisms, of a plurality of push-button devices upon each car respectively corresponding to the opening and to the closure of the several mechanisms, and means for connecting the door-closing circuit on one car through the door-closing push-button device in an adjacent car and through the door-opening device on the same car, the two devices occupying unlike positions.

10. The combination with a plurality of car-door-operating mechanisms, of a plurality of switching devices upon each car respectively corresponding to the opening and to the closure of the several mechanisms, and means for connecting the door-opening circuit on one car through the door-opening switching device in an adjacent car and through the door-closing device on the same car, the two devices respectively occupying an operated and a normal position.

11. The combination with a plurality of car-door-operating mechanisms, of a plurality of switching devices upon each car respectively corresponding to the opening and to the closure of the several mechanisms, and means for connecting unlike door-operating means for the respective mechanisms through switching devices on different cars under normal conditions.

12. The combination with a plurality of car-door-operating mechanisms severally having actuating coils respectively corresponding to the opening and to the closure of the several mechanisms, of a plurality of switching devices upon each car having analogous functions, and means for normally forming a closed circuit including said switching devices and unlike actuating coils on adjacent vehicles.

13. The combination with a plurality of car-door-operating mechanisms severally having actuating coils respectively corresponding to the opening and to the closure of the several mechanisms, of a plurality of switching devices upon each car having analogous functions, and means including only two train-line conductors for normally forming two closed circuits respectively comprising unlike switching devices and unlike actuating coils on adjacent vehicles.

14. The combination with a plurality of car-door-operating mechanisms severally having actuating coils respectively corresponding to the opening and to the closure of the several mechanisms, of a plurality of switching devices upon each car having analogous functions, and means including only one train-line conductor for connecting the door-closing circuit on one car through the door-closing switching device in an adjacent car and through the door-opening device on the same car.

15. The combination with a plurality of car-door-operating mechanisms severally having actuating coils respectively corresponding to the opening and to the closure of the several mechanisms, of a plurality of push-button devices upon each car having analogous functions, and means including only two train-line conductors for connecting the door-opening circuits on each of two adjacent cars through the door-opening push-button device on the other car and through the door-closing device on the same car.

In testimony whereof, I have hereunto subscribed my name this 22nd day of April 1919.

ANDREW H. CANDEE.